H. DE W. COX.
FOLDING VEHICLE TOP HOLDER.
APPLICATION FILED MAR. 26, 1913.
1,092,898.
Patented Apr. 14, 1914.
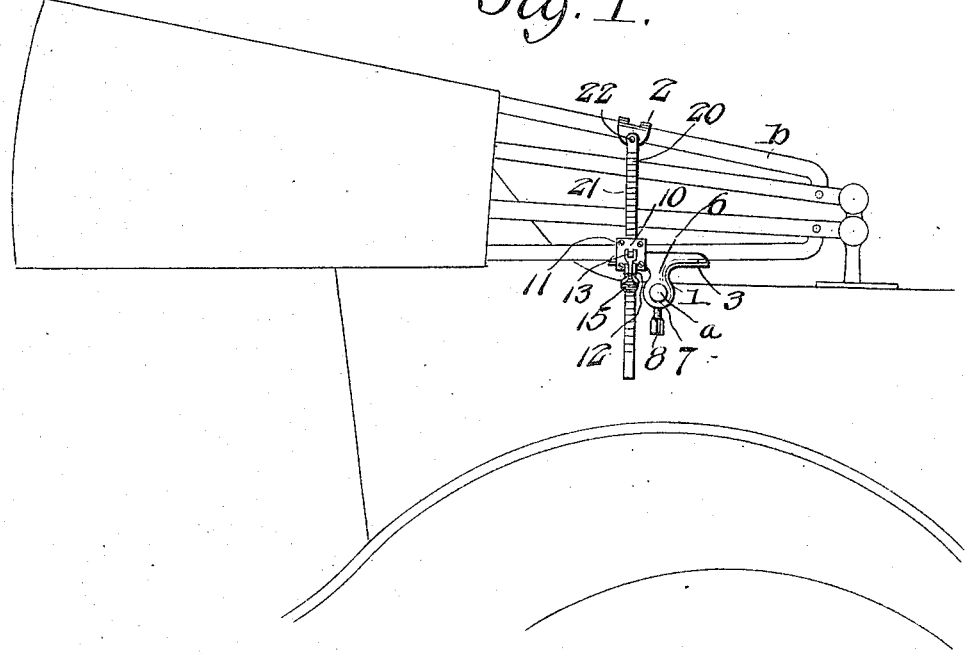
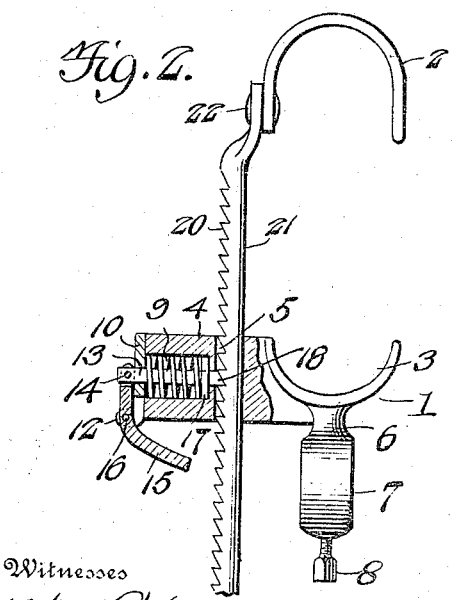
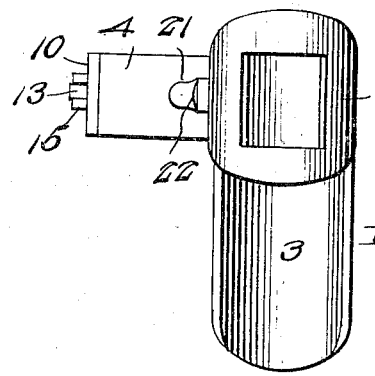
Witnesses
Hugh H. Ott
J. W. Garner
Inventor
H. D. Cox
By Victor J. Evans
Attorney

UNITED STATES PATENT OFFICE.

HARRY DE WITT COX, OF RICHMOND, VIRGINIA.

FOLDING-VEHICLE-TOP HOLDER.

1,092,898.  Specification of Letters Patent.  Patented Apr. 14, 1914

Application filed March 26, 1913. Serial No. 756,918.

*To all whom it may concern:*

Be it known that I, HARRY D. COX, a citizen of the United States, residing at Richmond, in the county of Henrico and State of Virginia, have invented new and useful Improvements in Folding-Vehicle-Top Holders, of which the following is a specification.

This invention is an improved holder especially adapted for use for holding the folding tops of buggies, carriages and automobiles, when the said tops are lowered so as to prevent the tops from moving vertically when lowered as by the motion of the vehicle, thus preventing the tops from being injured by such motion and also avoiding the exertion and undesirable stress on the body of the vehicle incident to loose vertical motion of a folded top, the invention consisting in the construction, combination and arrangement of devices hereinafter described and claimed.

The object of my invention is to provide an improved holder which may be readily attached to a buggy or other vehicle, which may be adjusted for use on a folding vehicle top of any size and which may be readily and instantly engaged or disengaged with the top, at will.
In the accompanying drawing:—Figure 1 is a front elevation, partly in section, of a folding vehicle top holder constructed in accordance with my invention, showing the same in position at one side of a vehicle body and in operative relation to a folded top a portion of the vehicle body and the bows of the top being indicated in dotted lines. Fig. 2 is a side elevation of the same. Fig. 3 is a plan of the same.
My improved folding vehicle top comprises essentially a lower member 1 adapted to be secured at one side of a vehicle body and to engage the lower bow of a vehicle top, an upper member 2 to engage the upper bow of the vehicle top when the latter is folded, and adjustable means between the said members. The lower member 1 is formed with a saddle 3 to receive the lower side of the lower bow of a folding vehicle top at one side of the vehicle, and has an outwardly extending arm 4 which has a vertical bore 5.

At the center of the saddle is a downwardly extending standard 6, having an eye 7 to receive the usual stud $a$ which projects from the side of a vehicle body, the said standard also having a clamping screw 8 to engage said stud and thus securely and yet detachably fasten the lower member to the stud. The arm 4 of the member 1 is also provided with a horizontal outwardly extending bore 9. On the outer end of the said arm is a cap 10, detachably secured to the arm by screws or other suitable devices 11, the said cap having a small square opening concentric and communicating with the bore 9 and being also provided at its upper side with a pair of lugs 12. A locking bolt or dog 13 which is cross sectionally rectangular is arranged in the bore 9 and passes through and is slidable in the opening in the cap 10 and has its outer end pivotally connected as at 14 to a latch handle lever 15 which is fulcrumed as at 16 between the ears or lugs 12.

Near the inner end of the dog is a circular enlarged head 17 which fits and is slidable in the bore 9, the extreme inner end of the dog being beveled as at 18 and adapted to engage between any of the ratchet teeth 20 of a connecting rod 21. This connecting rod has its upper end pivotally connected as at 22 to one side of the semitubular upper member 2 which in effect forms a clamping saddle to engage over the upper bow $b$ of the folding top at one side thereof. The pivot 22 enables the member 2 to adjust itself to the angle of the upper bow of the top so that both ends of said member 2 bear firmly on said bow and at any angle at which the bow may lie as indicated in Fig. 1.

The rod 21 is cylindrical in form and fits and is slidable in the vertical bore 5 of the arm of the lower member 1. Hence, the rod 21 coacts with the locking dog 13 to form an adjustable connection between the lower and upper members to permit of any desired adjustment of the upper member according to the size of the folding top with which the device is employed and to also permit the upper member to be locked at any desired adjustment.

Owing to the cylindrical construction of the rod 21 and the bore 5, the rod, when its upper member 2 has been released from the top bow of the vehicle top may be then turned so as to swing the upper member outwardly out of the vertical path of the vehicle top so as to permit the latter to be raised.

It will be understood that when the members 1—2 are, respectively, engaged with the lower and upper bows of a vehicle top and the locking dog 13 is engaged with the connecting rod 21, the top is effectually prevented from moving vertically by the motion of the machine, all lost or loose motion of the top is prevented and the top is protected from injury and from racking the vehicle body. It will be understood that one of my improved holders will be used on each side of the body of the vehicle to engage the base of the folding vehicle top at opposite sides.

While I have herein shown and described a preferred form of my invention, I would have it understood that changes may be made in the form, proportion and construction of the several parts without departing from the spirit of the invention and within the scope of the appended claim.

I claim:—

A folding vehicle top holder comprising a lower member having means to receive the lower side of a folding vehicle top and also having attaching means and a vertical guide opening; an upper member to engage over the upper side of a folded vehicle top, a connecting rod attached to the upper member and slidable in the vertical opening of the lower member, means to secure said rod at any desired adjustment to said lower member, the said rod being revoluble in the opening of the lower member, and the upper member being pivotally connected to the upper end of the said rod.

In testimony whereof I affix my signature in presence of two witnesses.

HARRY DE WITT COX.

Witnesses:
BEN BERGMAN,
C. T. CRAWFORD.